Figure 17:
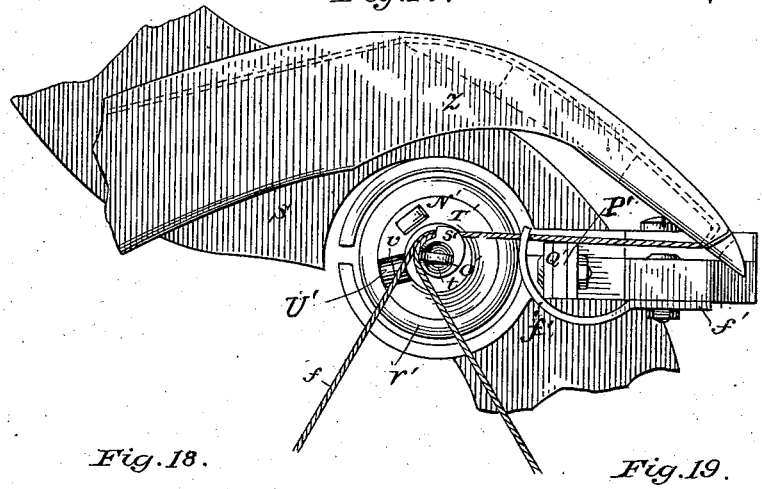
Figure 18:
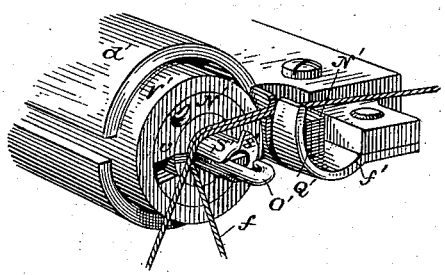
Figure 19:
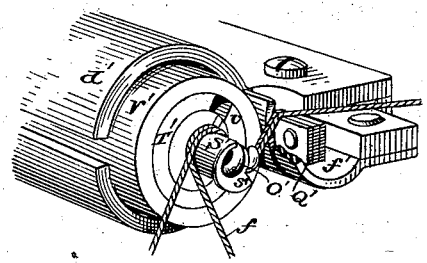
Figure 20:
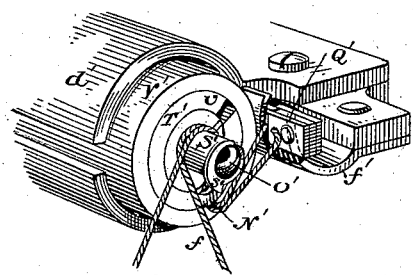
Figure 21:
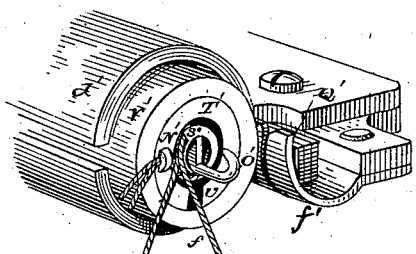
Figure 22:
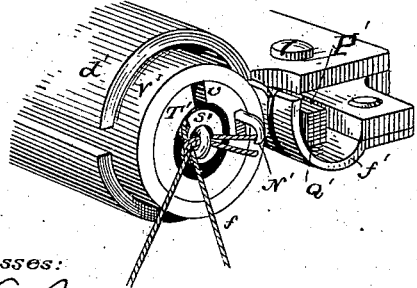
Figure 23:
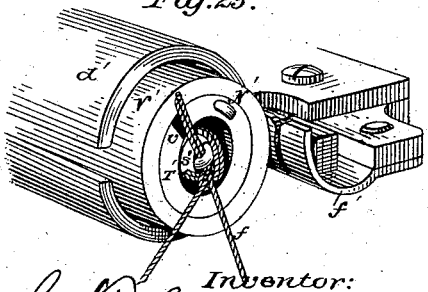

(Model.)
G. F. GREEN.
AUTOMATIC GRAIN BINDER.
No. 260,093. Patented June 27, 1882.
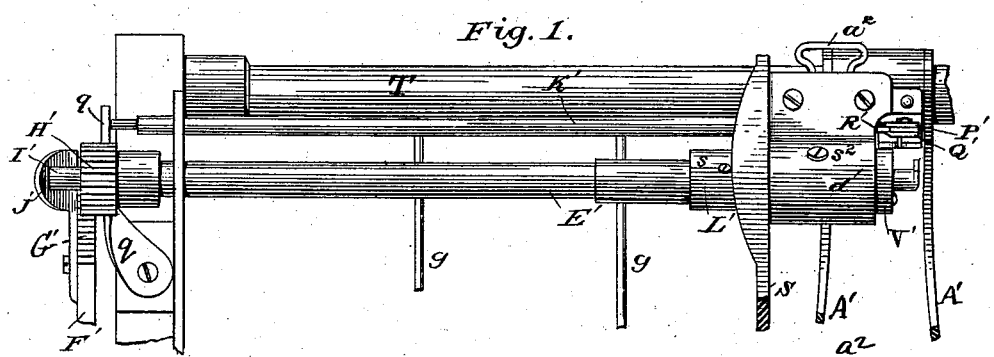
Fig. 1.
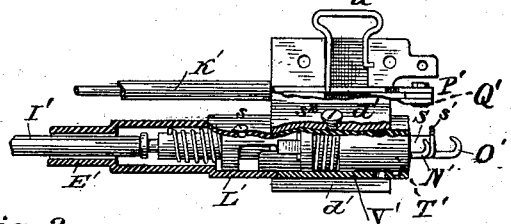
Fig. 2.
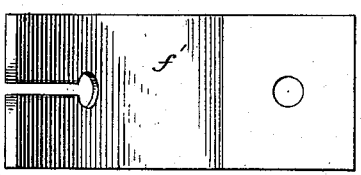
Fig. 3.
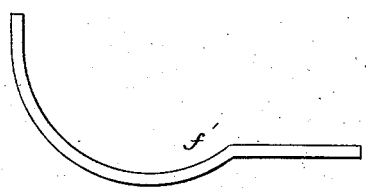
Fig. 4.
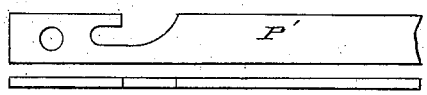
Attest:
R. F. Barnes.
Aug. L. Jordan
Inventor:
Geo. F. Green
By his Atty
R. D. Smith

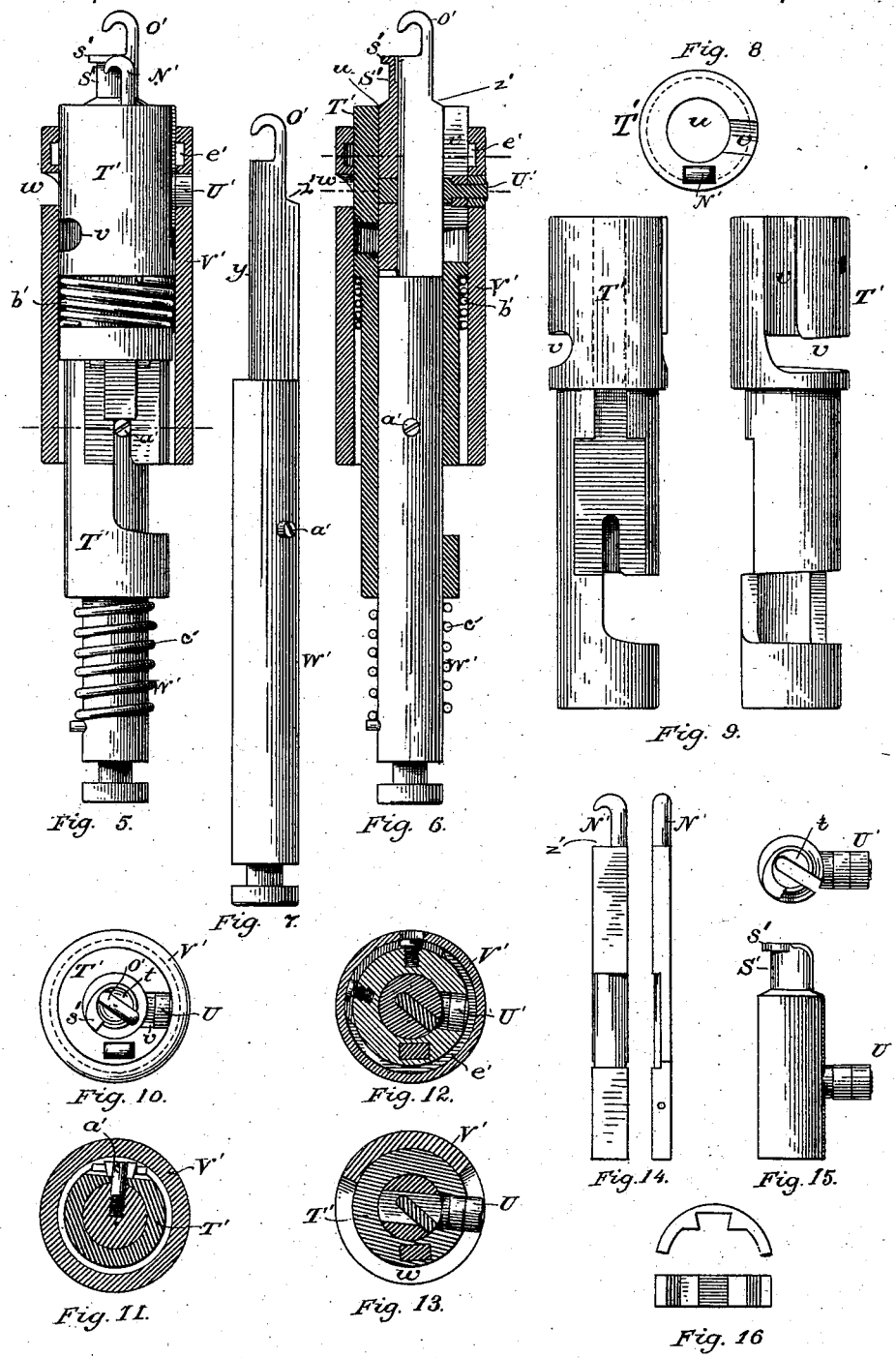

(Model.)

G. F. GREEN.
AUTOMATIC GRAIN BINDER.

No. 260,093. Patented June 27, 1882.

5 Sheets—Sheet 3.

Witnesses:
R. F. Barnes
Aug. Jordan

Inventor:
Geo. F. Green
By his atty
R. D. Smith (Model.)
5 Sheets—Sheet 4.
G. F. GREEN.
AUTOMATIC GRAIN BINDER.
No. 260,093. Patented June 27, 1882.
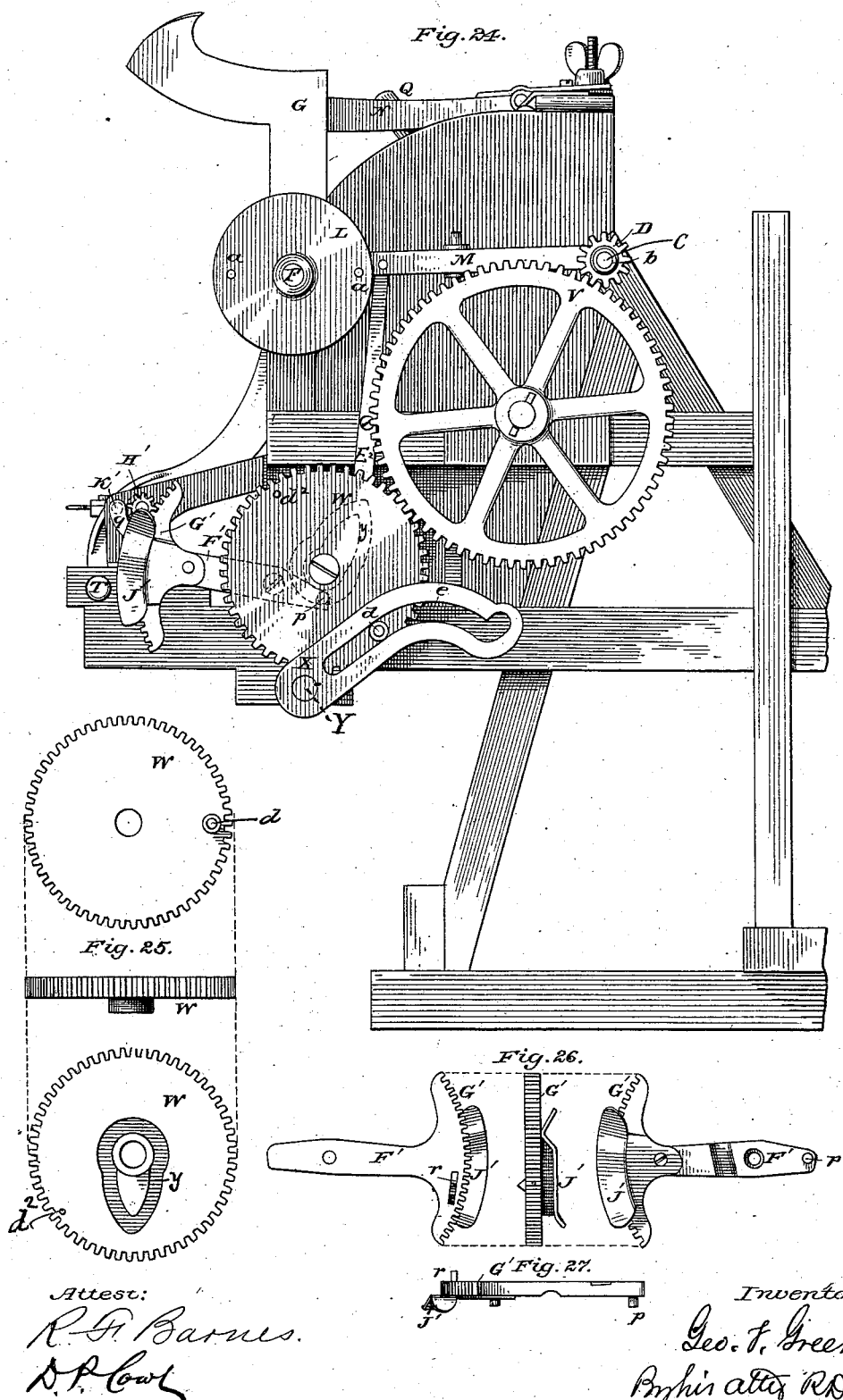

(Model.)
5 Sheets—Sheet 5.
G. F. GREEN.
AUTOMATIC GRAIN BINDER.
No. 260,093. Patented June 27, 1882.
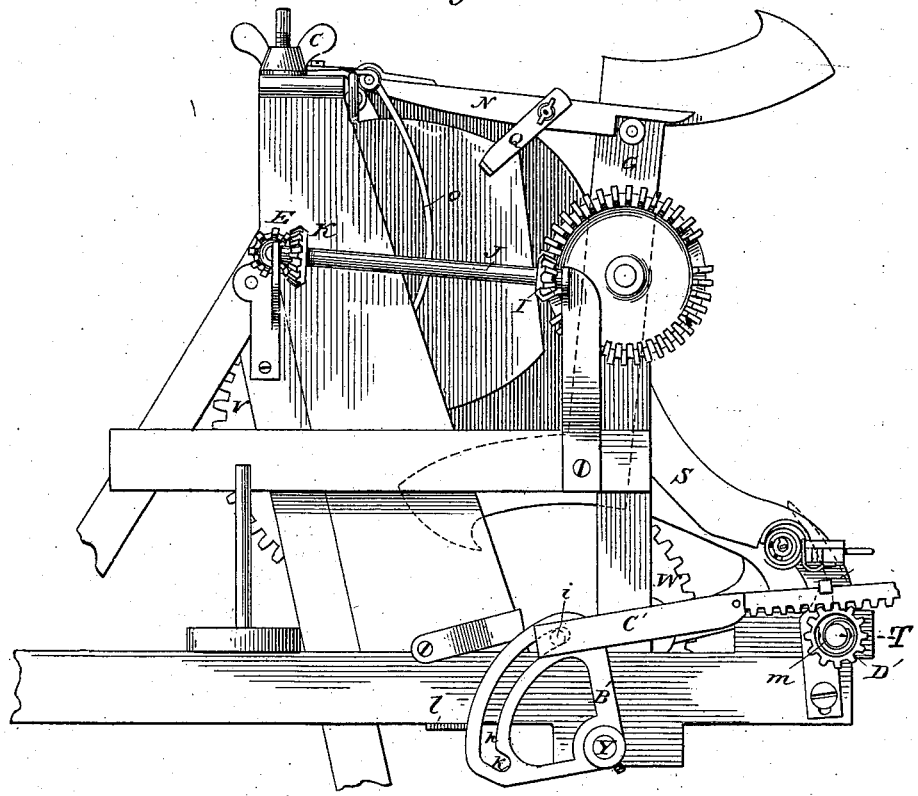
Attest:
R. F. Barnes.
L. H. Marshall.
Inventor:
Geo. F. Green

UNITED STATES PATENT OFFICE.

GEORGE F. GREEN, OF KALAMAZOO, MICHIGAN, ASSIGNOR TO WILLIAM N. WHITELEY, JEROME FASSLER, AND OLIVER S. KELLY, OF SPRINGFIELD, OHIO.

AUTOMATIC GRAIN-BINDER.

SPECIFICATION forming part of Letters Patent No. 260,093, dated June 27, 1882.

Application filed March 17, 1880. (Model.)

*To all whom it may concern:*

Be it known that I, GEORGE F. GREEN, of Kalamazoo, Kalamazoo county, Michigan, have invented new and useful Improvements in Automatic Grain-Binders; and I do hereby declare that the following is a full and exact description of the same.

This invention belongs to that class of binders where cord is used as a binding material.

The mechanisms whereby the gavel may be separated and compressed and the band placed around the same and the bound bundle finally discharged are various, and so far as the devices for forming and securing the knot claimed in this patent are concerned it is immaterial by what means the operations preliminary to securing the band are accomplished, provided they are efficiently performed and the band is properly presented to the devices whereby it is secured.

The special devices which are partly shown in the drawings hereto attached for presenting the band, &c., are reserved for the subject of another patent.

That others may fully understand my invention, I will describe it in detail, having reference to the accompanying drawings, wherein—

Figure 1 is a plan view accompanied by a partial section of the knotting apparatus. Fig. 2 is a plan and elevation of the slitted cord-guide. Figs. 3 and 4 represent in plan and elevation the cord holder and cutter. Figs. 5, 6, 7, 8, 9, 14, 15, and 16 are details of the knotting apparatus in plan and longitudinal section. Fig. 10 is an end view of the same. Figs. 11, 12, and 13 are transverse sections of the same. Fig. 17 is an end elevation of the knotter and cord-arm, showing the parts in operative position. Figs. 18, 19, 20, 21, 22, and 23 are perspective views of the knotter, representing the operation of tying the knot in its different stages. Fig. 24 is an end elevation, showing the working devices at that end of the machine. Fig. 25 represents the wheel and cam by which the knotting devices are actuated. Figs. 26 and 27 represent the segment and cam which give immediate action to the knotter. Fig. 28 is a rear end elevation of the binder. Fig. 29 represents the slotted arm which assists in actuating the compressor-shaft. Fig. 30 represents the rack-bar intermediate between said slotted arm and the compressor-shaft. Fig. 31 represents the pinion on the compressor-shaft in engagement with said rack-bar.

The binding mechanism derives its motion from the elevator-roller C, upon the end of which the loose pinion D and the fast clutch-hub $b$ are located. The separator G is mounted on the shaft F, and is locked in position by an arm, N, which is automatically tripped by the grain accumulating in the receptacle and pressing upward against an arm, Q, adjustably attached to the arm N. The divider G, when unlocked, is started by the weight of the grain pressing upon it, and is thereby caused to engage independently with the elevator-roller to receive its positive motion of rotation. The wheel L, bearing the studs or pins $a$, is mounted upon the shaft F, and at the completion of the movement of the separator the pin $a$ engages the clutch-lever M and pushes the pinion D into engagement with the clutch $b$, and thereby starts the wheel V, which transmits motion to the wheel W and to the operative parts of the mechanism, whereby the knot is formed and secured. At the completion of the whole operation of separating, binding, and discharging the bundle, the second and third operations whereof are comprised within one revolution of the wheel W, a pin, $d^2$, projecting from the back of the wheel W, engages with the lever $E^2$, and thereby moves the lever M to disengage the pinion D from the clutch $b$.

The above-described parts are included in another application filed of even date herewith, and therefore are not claimed herein.

*The mechanism which actuates the cord-knotter.*—The wheel W, in addition to its duty in actuating the arm X and cord-arm, also at the proper periods actuates the knotting devices which are carried by the barrel E', which has imparted to it an intermittent rotation forward and backward about one and one-fourth turn each way. The wheel W has on its inner face a cam-groove, $y$, rather more than half of which is concentric with the axis of said wheel, and the remainder is in the form of an elongated ellipse. A stud, $p$, at the end of the segment-rack lever F', traverses said groove, and at each revolution of the wheel W it imparts to said lever an intermittent vibration.

The segment-rack G', at the end of said lever F' opposite the stud $p$, meshes with the pinion H', which is secured to the end of the barrel E', and said barrel is rotated, as above set forth, at each reciprocation of the rack. The wheel W bears a wrist or crank pin, $d$, which traverses a slot $e$ in the arm X, said slot $e$ being curved with a radius equal to the radius of the motion of the crank-pin $d$, so that at one part of the path of the latter it simply traverses said slot without changing the position of the arm X, and during the other part of its orbit it causes said arm to vibrate with a variable motion due to the varying distance of said pin from the axis of said arm. The movement of the arm X communicates a similar movement to the shaft Y, with which said arm is connected, and therefore to the cord-carrying arm Z, which is mounted upon and carried by said shaft Y.

Opposed to the cord-arm Z there is a compressor A', mounted upon the shaft T. This compressor is composed of two curved plates separated a little distance apart, so as to avoid compression of the band, and thereby prevent it from drawing tightly around the bundle. The barrel E' is tubular, and its central part is occupied by a rod or piston I', which is pushed inward at a certain point of each forward and backward movement of the rack G', and thereby the gripping-hooks, which seize and hold the cord, are pushed out at the proper moment. A cam-plate, J', fixed upon the rack G' and made adjustable thereon for the proper timing of the hook movements, is the means of actuating the piston I'.

A rod, K', is placed in bearings parallel with the barrel E', and is movable endwise in its bearings to actuate the primary gripper and cutter, whereby the band is severed from the cord which comes from the spool and the new end is held. The outer end of said rod K' rests under the free end of a short lever, $q$, which is struck and pushed inward by a cam-latch, $r$, which is set in the back face of the segment-lever F', and said latch is adjusted so that it closes on the backward movement, but opens and depresses the lever $q$ on its forward movement. This may be arranged by a spring placed under said latch to permit it to close when pressed upon its back, but open again so soon as said pressure is removed.

*The cord-knotter.*—The barrel E' carries at its forward end a sleeve, L', to which the operative parts of the knotter are secured by a screw, $s$, or other proper and adequate means. This structure is adapted to render the knotting device easily removable as a whole. Inside the barrel the pusher or piston rod I' is placed to transmit motion from the cam J' to the gripper-hook N', which seizes the ends of the band as they are severed, and to the hook O', which seizes and holds the loop to form the knot.

Outside of and parallel with the barrel E' is the rod K', which is coupled at its forward end with the cutter Q' and holder P', by which the band is severed from the cord and the new end of the latter is held securely.

The holder consists of a bar having a re-entering or hooking notch on one edge, into which the cord enters, and is firmly held by being jammed against the edges of the socket in which said holder-bar is confined. The cutter Q' is an adjustable blade firmly bolted to the side of the holder-bar and moving with it. The edge of the blade shears against a stationary plate, R', and severs the band-cord between the holder P' and the knotter. The holder P' is retracted by the spring $a^2$.

The knotting device consists of the two holding-hooks N' and O' and a neck, S', around which the cord is carried to form a knot. The neck S' is provided with a laterally-projecting lip or flange, $s'$, and a central cavity or recess, $t$, into which the looper-hook O' retreats. The neck S' has through a certain distance a rotary motion coincident with the motion of the sleeve. When the rotary motion ceases it is transformed into a reciprocating motion, and the neck retreats into a chamber, $u$, in the end of the sleeve T', which incloses said neck. The several movements of rotation and reciprocation of the neck S' are produced by the passage of the stud U', which projects laterally from the neck S' in the slot $v$ in the moving sleeve T' and the slot $w$ in the stationary case V', which surrounds the sleeve T'. The slot $v$ enters the sleeve T' at its end and passes for a certain distance in a longitudinal direction, and then turns at right angles, or in a plane transverse to the axis of the sleeve, and traverses about two-thirds the circumference. The slot $w$ in the case V' extends in a plane transverse to the axis rather more than one-half the circumference, and then recedes from the end of the sleeve at an angle of about forty-five degrees. The stud U' projects through these slots, and, as the case V' is stationary, all the movements of the knotting device are determined by the distance said stud may traverse between the ends of said slot $w$.

The initial position of the parts is determined by the position of the stud U' at the extremity of the transverse part of the slot $w$ and in the longitudinal portion of the slot $v$. The two hooks are then housed and the neck projecting its fullest extent.

Between the knotter and the cutter Q' there is a slotted plate, $f'$, for a guide to direct and hold the cord in proper position to fall into the holder P' and in front of the knife Q'. Without this the sudden forward movement of the holder and cutter, with the cord resting upon them, would sometimes carry the cord forward also, and they would fail to grip and cut it properly. The plate $f'$ restrains any movement of the cord out of its proper line, and makes the proper operation of holder and cutter certain.

The pusher-rod I' bears against a core-piece, W', which passes through the center of the sleeve T' and butts against the base of the neck S'. The neck S' is slotted longitudinally to receive the shank of the looping-hook O', which is attached at its base to the core-piece or piston W'. The hooks O' and N' have both shoulders Z' at the junction of the hook with its shank for the purpose of clearing their seats of lint at each forward movement of the hook. Said neck S' and hook O' may have independent longitudinal movements while partaking of the same rotations.

A pin, $a'$, is set in the core W', and is so located that when the parts are in their initial position said pin is in line with the bar of the hook N', and when said core is pushed forward both hooks N' and O' will be at the same time projected forward out of their housing. Suitable springs, $b'$ and $c'$, retract said hooks with sufficient power to grip and hold the cord.

As heretofore stated, the sleeve L', carried by the barrel F', is fastened to the sleeve T' and causes it to rotate.

The case V' is secured in the stationary frame $d'$ of the knotter by a set-screw, $S^2$, and for convenience I prevent the withdrawal or longitudinal movement of the sleeve T' within the case V' by a groove, $e'$, in the inner face of the latter and a corresponding slide or projection secured to said sleeve and moving in said groove, though the same end may be attained in various other ways, which any mechanic will at once perceive.

The cord is unwound from a spool or from a ball, which is placed in a box or receptacle at some convenient part of the machine. The end of the cord is held by the holder P', and extends therefrom over the neck S' down in front of the sheaf and through the eye in the end of the cord-arm Z, and thence through a take-up or tension of some proper description, and to the spool or ball, which is the source of supply. While the parts of the knotter are in the initial position indicated, the cord-arm Z approaches and lays the other end of the band across the neck S' into the slit of the guide $f'$ and down upon the holder-bar P', and remains in that position while the knot is being formed and the sheaf discharged. When the cord has been so laid the rack G' begins to move, as hereinbefore described, and the barrel E' begins to rotate, and immediately succeeding the commencement of said rotation the cam J' encounters the pusher-rod I', and the hooks N' and O' are projected forward out of their housings. The former passes over and seizes the two cords which extend between the neck S' and the holder and grips them. At the following instant the stud $r$ encounters the arm $q$ and projects the holder P' and cutter Q' forward to release the old end of the band and let the cord drop into the notch of the holder P', the band ends being held solely by the hook N' and the end of the main cord by the holder P', when the same retreats and the cord is severed. The holder and cutter remain in their forward position until the rotation of the sleeve T' has drawn the old end away from the cutter. They are then released and the cord is severed. The continued rotation of the sleeves L' and T' carries the hook N' and ends of the band around the neck and under that part of the band which extends toward the sheaf. When the ends of the bands have been so carried under, the stud U' will have arrived at the inclined portion of the slot $w$, and in traversing said inclined part the neck S' will be drawn down into the cell $u$, and those parts of the cord which are behind the flange or lip $s'$ will be thereby confined and held.

It will be observed that while the ends of the band are held by the hook N' the rotation of the same winds the band about the neck S' to form the knot, and by so much as is so wound up the tightness of the band is increased. When, as will sometimes happen, the sheaf is very hard, the strain incident to winding up the band will overcome the closing pressure of the hook N', and the cord to form the knot will be drawn backward under said holder. The tension of the spring on said hook thereby becomes the ultimate measure of the band tension, and this may be so adjusted that there will not be any liability to break the cord. The retreat of the neck S' leaves the hook O' projecting, and when said retreat has ended the stud U' will have reached the transverse part of the slot $v$, and the sleeve T' may then rotate while the neck remains at rest. This further rotation causes the hook N' to carry the ends of the band over the parts of the cord which are wound upon the neck and into the hook O', which thereupon retreats and draws a loop down into the cell $t$. This act completes the forward rotation, and the reverse movement immediately commences. The neck is again advanced and the turns of the cord are discharged over the loop held by the hook O', which at last advances also and discharges said loop, the knot having been completed. The bundle is thereupon at liberty to be discharged.

Having described my invention, what I claim as new is—

1. The wheel W, provided with the cam-groove $y$, one part whereof is concentric to the axis and the remainder a long ellipse, and provided with the stud $d$, combined with the vibrating rack F', provided with stud $p$ to engage with said cam, the rotating barrel E', and the arm X, provided with the slot $e$, curved as described, and in engagement with the stud $d$, whereby the knotter and cord-carrier are operated with reference to the movements of each other.

2. The vibrating arm X, constructed with the longitudinal slot $e$ in one end, said slot being curved with a radius equal to the radius of motion of its driving crank-pin $d$, whereby the cord-carrier is actuated, combined with the cam-wheel W, which carries said crank-pin $d$, the vibrating rack F', operated by the engagement of its stud with the cam on said wheel, whereby the cord-knotter is actuated in proper time, the stud $d^2$, also carried by said wheel W, and the levers $E^2$ and M, whereby at the completion of the binding and delivery of a bundle the pinion D is uncoupled from the clutch $b$ and the binding mechanism brought to rest.

3. In an automatic binder provided with a rotating knotting apparatus to fasten together the ends of the band, a train consisting of a driving-pinion, D, upon the driving-shaft, and a clutch, $b$, whereby said pinion is placed in or out of engagement with the shaft, an intermediate wheel, V, to diminish speed, a wheel, W, provided with a cam whereby to operate a vibrating rack, F', and actuate the pinion H', whereby the knotter is driven, a stud, $d$, in engagement with a slotted arm, X, on the shaft Y, whereby the band-carrier is driven, and a stud, $d^2$, whereby the levers E² and M are actuated to move said pinion D out of engagement, as set forth.

4. In a cord-knotter for an automatic binder, the core W', bearing the looper-hook O', and provided with the pin $a'$, which projects in line with the gripper-hook N', whereby both of said hooks may be actuated by a single pusher-rod, I', as set forth.

5. The barrel T', to which is imparted a movement equal to one and one-half revolution or thereabout, provided with a reciprocating holder-hook, N', to seize and hold the ends of the band, a neck, S', caused to reciprocate and rotate by the action of a stud traversing the concentric but dissimilar grooves $v\ w$, around which neck the turns of the band are made, the band being held at one side, and a looping-hook in the center of said neck and reciprocating in the center thereof.

6. A rotating knotting device for a cord-binder, combined with a reciprocating holder-hook, N', spring $b'$, and piston W', provided with a stud, $a'$, whereby said piston is made common to both the holder and looping hook, and the ends of the band are seized and carried with the said rotating device independent of the cutter and holder, which severs the cord and holds the end of the new band, as set forth.

7. The rotating barrel E', combined with the cylinder S', which has a rotation with said barrel during a part of the rotation of the same, and a reciprocation and pause during the remainder of the rotation of said barrel, and the looper-hook O', which rotates with said cylinder, but reciprocates independently thereof, as and for the purpose set forth.

8. The cylinder S', constructed with a neck and lip or flange, $s'$, and provided with a stud U', combined with the sleeve T', which carries a clamp-hook, N', and is provided with a slot, $v$, as described, the stationary case V', provided with a groove, $w$, whereby the cylinder S' has imparted to it a rotation followed by a rectilinear movement, and the hook O', which rotates with said cylinder, but reciprocates independently.

9. The holder-hooks N' and O', each provided with a retracting-spring and terminating within the sleeve T', combined with a piston extending through said sleeve and protruding from its outer end, whereby said holder-hooks may be pushed forward or retracted at the proper times independent of the rotation of the sleeve, as set forth.

10. A device for knotting the cord of an automatic binder, constructed as a single structure and composed of an outer inclosing case, V', provided with the slot $w$, and adapted to be held in a proper seat in the frame of the machine, an inner rotary sleeve, T', provided with the slot $v$ and bearing the hook N', and a central neck, S', provided with a stud, U', which engages with slots $v$ and $w$, and is thereby intermittingly and alternately rotated, retracted, and left at rest, and the core W', bearing at its end the hook O', and provided with the pin $a'$ to engage the end of hook N', whereby both of said hooks may be simultaneously projected, the whole being bodily removable from the machine.

GEORGE F. GREEN.

Witnesses:
HENRY C. BRIGGS,
ROBERT W. KANE.